(12) United States Patent
Fischer et al.

(10) Patent No.: US 6,512,042 B1
(45) Date of Patent: Jan. 28, 2003

(54) WATERBORNE CROSSLINKABLE COATING COMPOSITIONS

(75) Inventors: Gordon Charles Fischer, Horsham, PA (US); Louis Carl Fioravanti, Jr., Collegeville, PA (US); Mark Stephen Frazza, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 08/769,023

(22) Filed: Dec. 18, 1996

(51) Int. Cl.[7] .............................................. C08L 33/14
(52) U.S. Cl. ....................... 524/558; 427/361; 427/368; 427/371; 427/385.5; 427/388.2; 427/388.3; 427/389.9; 427/391; 427/393; 427/393.5; 427/393.6; 524/543; 524/555; 524/556
(58) Field of Search .................................. 524/543, 558, 524/556, 555; 427/361, 368, 371, 388.2, 388.3, 385.5, 389.9, 391, 393, 393.5, 393.6

(56) References Cited

U.S. PATENT DOCUMENTS

| | | | | |
|---|---|---|---|---|
| 5,055,506 A | * | 10/1991 | Knutson | 524/100 |
| 5,484,849 A | * | 1/1996 | Bors et al. | 525/167.5 |
| 5,498,659 A | * | 3/1996 | Esser | 524/549 |
| 5,525,662 A | | 6/1996 | Lavoie et al. | |

FOREIGN PATENT DOCUMENTS

| | | |
|---|---|---|
| EP | 0 264 983 A | 4/1988 |
| EP | 0 555 774 A1 | 8/1993 |
| JP | 4372674 | 12/1992 |
| JP | HEI 7-102218 | 4/1995 |
| WO | WO 93/16133 | 8/1993 |
| WO | WO 94/21738 | 9/1994 |
| WO | WO 95/09209 | 4/1995 |

OTHER PUBLICATIONS

"Calculating log (p–oct) from Structures", Chemical Reviews., vol. 93, No. 4, Jun. 1993, pp. 1281–1306, XPOO2116731; American Chemical Society, Easton., US, ISSN: 0009–2665.

European Search Report—EP 96 30 8423.

* cited by examiner

*Primary Examiner*—Judy M. Reddick

(57) ABSTRACT

Disclosed are aqueous, storage-stable, crosslinkable polymer compositions comprising: (a) an aqueous dispersion of a an acrylic polymer component containing certain carbonyl-containing functional-groups; (b) a nitrogen-containing compound having at least two carbonyl-reactive nitrogen groups; and (c) optionally, co-solvents, pigments, fillers, dispersants, wetting agents, anti-foam agents, UV absorbers, antioxidants, biocides, and stabilizers. Such compositions are useful as coatings or binders in coating compositions, or as adhesives.

15 Claims, No Drawings

WATERBORNE CROSSLINKABLE COATING COMPOSITIONS

BACKGROUND OF THE INVENTION

The present invention relates generally to crosslinkable waterborne polymer compositions, especially emulsions or dispersions. In particular, the present crosslinkable waterborne polymer compositions are useful as coatings or binders in one-pack storage-stable coating compositions which have low moisture permeability.

It is well known that the durability and aesthetic value of a variety of substrates can be maintained or enhanced by application of a polymeric coating to the surface of such substrates, and that crosslinking after application improves coating performance (for example, by improving film hardness and strength, as well as chemical resistance properties). These improvements are particularly beneficial to substrates that require protection from environmental stresses, or substrates to which abrasives or organic solvents (cleaners) are frequently applied.

Where polymer particle dispersions contain amine nitrogen reactive carbonyl functional groups, maintaining dispersion stability in the presence of polyfunctional amines is difficult. One method of obtaining a stable polymer particle dispersion in an aqueous carrier is to incorporate carboxy acid functional groups into the polymer backbone. It is thought that, in an aqueous carrier at a pH equal to or greater than the pKa of the acid group, some of the carboxy acid groups located on the surface of the polymer particles ionize and form a dispersion-stabilizing electric double layer around the polymer particle. Sufficient carboxy acid groups must be present to block effectively the reaction between the amine nitrogen groups of the crosslinking agent and the carbonyl groups present on the dispersed polymer particles. Examples of such compositions are disclosed in EP 555 774 A1 (Kriessmann et al.) and WO 93/16133 (Esser). The main drawback to this method is that, although the carboxy acid groups on the polymer backbone stabilize the dispersion, these groups also increase moisture permeability of the resultant coating. That is, in the resulting polymeric coating, the presence of the carboxy acid groups increases the amount of water which is able to pass through the coating or which is absorbed by the coating itself, thus allowing more water to attack the substrate.

An alternate method of stabilizing a polymer particle dispersion is to incorporate certain hydrophilic compounds (such as amine-functional polyalkleneoxide compounds) into the dispersion. Examples of such compositions are disclosed in WO 95/09209 (Serelis et al.), which teaches that use of a polyoxyalkylene amine crosslinker increases storage-stability of the compositions. These compositions, however, have the same drawback as the previously described compositions, since the presence of such polyoxyalkylene amines is also known to increase the moisture permeability of such coatings.

The problem of storage-stability is addressed in the above-mentioned references, but at the expense of coating performance—through either the incorporation of high amounts of carboxy acid in the polymer backbone, or the use of hydrophilic, dispersion stabilizing crosslinkers such as polyoxyalkyldiamines. What is desired, then, is a one-pack storage-stable composition where coating performance (i.e., water resistance) is not sacrificed.

STATEMENT OF THE INVENTION

The coating compositions of the present invention comprise: (a) a polymeric component comprising an aqueous dispersion of latex polymer particles neutralized to a pH of not less than 6, the polymer having a Hansch value of 1.5 or greater, an acid number of 0–25, at least 5 percent by weight ("wt %") of a carbonyl functional group capable of reacting with a nitrogen moiety, and at least 1 wt % of a non-acidic functional group having hydrogen-bondable moieties; and (b) a crosslinking agent comprising a nitrogen-containing compound having at least two nitrogen functional groups capable of reacting with a carbonyl functional moiety, wherein the mole equivalents ratio of such crosslinking agent to reactive carbonyl moieties is at least 0.25:1.

DETAILED DESCRIPTION OF THE INVENTION

As used in this specification, the following terms have the following definitions, unless the context clearly indicates otherwise. "Crosslinkable" and "crosslinking" refer to the formation of new chemical bonds between existing polymer chains, and "curing" refers to the crosslinking polymers after application to the substrate. "Storage-stable" refers to a coating composition wherein the reactive components do not substantially crosslink within the storage container itself, even upon prolonged storage. "Pot life" or "shelf life" refers to the period of time a composition is storage-stable. "Two-pack" or "two-component" refers to coating compositions (or systems) wherein the components are stored separately, then are mixed together just before use; on the other hand, "one-pack" or "one-component" refers to coating compositions wherein the components are stored in one container. Ranges specified are to be read as inclusive, unless specifically identified otherwise.

The multi-component one-pack storage-stable coating compositions of the present invention will include at least 5 wt % solids of the carbonyl functional group containing polymeric component, based on the total weight of the final composition. It is preferred that the compositions of the present invention will preferably include 5–70 wt % solids of the carbonyl functional group containing polymeric component, and most preferably 10–50 wt %.

The polymeric component of the present invention may be prepared by emulsion polymerization or (aqueous) dispersion polymerization techniques known to those skilled in the art. Ethylenically unsaturated monomers may be used to prepare the emulsion or dispersion polymers that constitute the polymeric component of this invention. Examples of suitable monomers include ethylenically unsaturated monomer, such as, for example, acrylic ester monomers including methyl acrylate, ethyl acrylate, butyl acrylate, 2-ethylhexyl acrylate, decyl acrylate, methyl methacrylate, ethyl methacrylate, butyl methacrylate, lauryl (meth) acrylate, isobornyl (meth)acrylate, isodecyl (meth)crylate, oleyl (meth)acrylate, palmityl (meth)acrylate, stearyl (meth) acrylate, hydroxyethyl (meth)acrylate, and hydroxypropyl (meth)acrylate; acrylamide or substituted acrylamides; styrene or substituted styrenes; butadiene; ethylene; vinyl acetate; vinyl ester of "Versatic" acid (a tertiary monocarboxylic acid having $C_9$, $C_{10}$ and $C_{11}$ chain length, the vinyl ester is also known as "vinyl versatate"), or other vinyl esters; vinyl monomers, such as, for example, vinyl chloride, vinylidene chloride, vinyl pyridine, N-vinyl pyrrolidone; non-reactive amino monomers, such as, for example, N,N'-dimethylamino (meth)acrylate, chloroprene, and acrylonitrile or methacrylonitrile. In addition, polyfunctional ethylenically unsaturated monomers may be incorporated, including allyl-, vinyl-, and crotyl- esters of acrylic, methacrylic, maleic, and fumaric acids, di- and tri-(meth) acrylate derivatives, divinylbenzene, diallylphthalate, triallylcyanurate, and polyvinyl ethers of glycols and glycerols. Suitable copolymerizable ethylenically-unsaturated acid monomers include, but are not limited to, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methyl-1-propanesulfonic acid, sodium vinyl sulfonate, and phosphoethyl methacrylate.

The polymeric component will have an Hansch value of 1.5 or greater, and an acid number of 0–25. The acid number of the polymer is preferably 1–20, and most preferably 5–15. The polymeric component will additionally contain at least 5 wt % (based on the weight of the monomer containing that group) of a carbonyl functional group capable of reacting with an amine nitrogen moiety, preferably at least 8 wt %, and most preferably at least 12 wt %; and at least 1 wt % (based on the weight of the monomer containing that group) of a non-acidic functional group having hydrogen-bondable moieties, preferably at least 3 wt %, and most preferably at least 5 wt %.

The hydrogen-bondable moieties of the polymeric component may include, but are not limited to, hydroxy, amido, alkylether, nitrilo, tertiary amino, or mercapto. Examples of such functional components include monomers such as hydroxyethyl (meth)acrylate, hydroxypropyl (meth)acrylate, acrylonitrile, acrylamide, methacrylamide, N-(hydroxyethyl)(meth)acrylamide, N,N-bis(hydroxyetthyl)-(meth)acrylamide, dimethylaminoethyl methacrylate, and chain transfer agents or initiators which contain hydrogen-bondable moieties, such as hydroxyethyl mercaptan, 2,2'-azobisisobutyronitrile, 2-(carbamoylazo) isobutyronitrile, or 2,2'-azobis[2-methyl-N-(2-hydroxyethyl) propionamide].

The amine-reactive, carbonyl-functional group of the polymeric component may include, but is not limited to, ketone- or aldehyde-functional ethylenically unsaturated monomers such as diacetone acrylamide, (meth) acryloxyalkyl benzophenone, (meth)acrolein, crotonaldehyde, 2-butanone(meth)acrylate, as well as active methylene compounds such as the esters and amides of acetoacetic acid. Preferred are the esters of acetoacetic acid. When monomer(s) that do not bear active methylene groups are used exclusively in the formation of the polymer or when additional acetoacetate groups are desired, acetoacetate groups may be introduced by the use of acetoacetate-functional chain transfer agents, such as those disclosed in U.S. Pat. No. 4,960,924 or by post-reaction of a copolymerized monomer. Cyanoacetates and cyanoacetamides may be prepared by methods known in the art as disclosed, for example, in U.S. Pat. Nos. 3,554,987; 3,658,878; and 5,021,511. U.S. Pat. Nos. 4,960,924; 3,554,987; 3,658,878; and 5,021,511 are hereby incorporated by reference herein.

In preparing the polymeric component, any chain-transfer agent, or mixtures thereof, may be used to control molecular weight. Suitable chain transfer agents include, for example, $C_1$ to $C_{12}$ alkyl or functional alkyl mercaptans, alkyl or functional alkyl mercaptoalkanoates, or halogenated hydrocarbons, and may be employed in the polymer at levels of 0.1–10 wt %, based on the weight of the polymer.

The ethylenically unsaturated monomers are typically polymerized in the presence of water-soluble or oil-soluble initiators (i.e., persulfates, peroxides, hydroperoxides, percarbonates, peracetates, perbenzoates, azo-functional compounds and other free-radical generating species).

Chelating agents may be used in emulsion or dispersion polymerization to provide stability. Such agents include those having multi-functional polar groups, and are capable of complexing with metal ions. Typical chelating agents useful in the present invention include but are not limited to: phosphoric acid, phosphates and polyphosphates; n-phosphonoalkyl-n-carboxylic acids; gem-diphosphono-alkanes and gem-diphosphonohydroxyalkanes; compounds containing one or more aminedi(methylenephosphonic acid) moieties, such as aminotris(methylene-phosphonic acid), ethylenediaminetetrakis(methylenephosphonic acid), and diethylenetriamine-N,N,N',N",N"-penta (methyleenephosphonic acid); compounds containing one or more aminedi(methylenecarboxylic acid) moieties, such as N-(2-hydroxyethyl)ethylenediaminetriacetic acid ("HEDTA"), ethylenediaminetetraacetic acid ("EDTA"), and nitrilotris(methylenecarboxylic acid); as well as their alkali metal and ammonium salts. Such agents will be used in the present invention in amounts of 0–5 wt % based on the total weight of polymer.

Surfactants are commonly used in emulsion or dispersion polymerization to provide stability, as well as to control particle size. Conventional surfactants include anionic or nonionic emulsifiers or their combination. Typical anionic emulsifiers include but are not limited to: alkali or ammonium alkyl sulfates, alkyl sulfonates, salts of fatty acids, esters of sulfosuccinic acid salts, alkyl diphenylether disulfonates, and salts or free acids of complex organic phosphate esters. Typical nonionic emulsifiers include but are not limited to: polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxy-alkylene derivatives of hexitol, including sorbitans, sorbides, mannitans, and mannides. Surfactants may be employed in the compositions of the present invention at levels of 0.1–3 wt % or greater, based on the total weight of the final composition.

Any nitrogen-containing compound having at least two carbonyl group reactive amine nitrogens can be employed as the crosslinking agent in the present invention. Such compounds can be aliphatic or aromatic, polymeric or non-polymeric, and can be used alone or in combination. Examples of suitable compounds include: ethylenediamine, propylenediamine, tetramethylenediamine, pentamethylenediamine, hexamethylenediamine, piperazine, aminoethylpiperazine, diethylenetriamine, triethylenetetramine, tetraethylenepentamine, cyclohexyldiamine, isopheronediamine, triaminoethylamine, diaminoethanolamine, phenylenediamine, and biphenyldiamine, hydrazine, alkyl dihydrazines, alkylene dioxime ethers, and water soluble dihydrazides of dicarboxylic acids (for example, dihydrizides of malonic, succinic, and adipic acids). Such crosslinking agent is used in an amount sufficient to react with at least 0.25 carbonyl functional group equivalents present in the polymeric component, preferably in an amount sufficient to react with at least 0.5 carbonyl functional group equivalents, and most preferably, at least 1 carbonyl functional group equivalents. That is, the mole ratio of such crosslinking agent to reactive carbonyl moieties is at least 0.25:1, preferably 0.5:1, and most preferably 1:1.

Other optional components that can be included in this invention include co-solvents, pigments, fillers, dispersants, wetting agents, anti-foam agents, UV absorbers, antioxidants, biocides, and stabilizers.

The multi-component one-pack storage-stable coating compositions of the present invention are generally prepared by blending the polymeric component and the crosslinking agent with agitation or stirring, then adding the optional components (as desired) in any order of addition which does not cause an incompatibility between components. Components which do not dissolve in the aqueous carrier (such as pigments and fillers) can be dispersed in the aqueous polymeric component or an aqueous carrier or cosolvent using a high shear mixer such as sand mill or Cowls mixers. The pH of the coating composition can be adjusted by adding an acid or a base, with agitation. Examples of base include, but are not limited to ammonia, diethylamine, triethylamine, dimethylethanolamine, triethanolamine, sodium hydroxide, potassium hydroxide, and sodium acetate. Examples of acids include, but are not limited to acetic acid, formic acid, hydrochloric acid, nitric acid, and toluene sulfonic acid.

The coating compositions of the present invention can be used to provide coatings on suitable substrates such as wood and reconstituted wood products, concrete, asphalt, fiber cement, stone, marble, clay, plastics (for example, polystyrene, polyethylene, ABS, polyurethane, polyethylene terphthalate, polybutylene terphthalate, polypropylene, polyphenylene, polycarbonate, polyacrylate, PVC, Noryl®, and polysulfone), paper, cardboard, and metal (ferrous as well as non-ferrous).

The coating compositions of the present invention can be applied to desired substrates using conventional application techniques such as conventional or airless spray, roll, brush, curtain, flood, and dip-coating methods. Once applied to the substrate, the coating compositions can be cured at ambient or elevated temperatures.

Besides coating applications, the compositions of the present invention can be used alone or in combination with other components to provide, for example, adhesives, sizing agents, composites, impregnants, castings, caulks, and nonwoven binders.

The following examples are presented to illustrate further various aspects of the present invention, but are not intended to limit the scope of the invention in any respect.

EXAMPLE 1

A stirred reactor containing 1012 grams ("g") deionized water, 2.3 g sulfated nonyl phenolethoxylate surfactant, and 29.7 g itaconic acid, was heated to 82° C. under a nitrogen atmosphere. A charge of 155 g of monomer emulsion, shown below, was added to the reactor with a 25 g deionized water rinse, followed by 5 g ammonium persulfate dissolved in 30 g deionized water. After 13 minutes, the remainder of the monomer emulsion and a solution of 3 g ammonium persulfate in 100 g deionized water were pumped into the reactor over a 2.5 hour period while the reactor temperature was maintained at 82° C. Thirty minutes after completion of the feeds, the batch was cooled to 65° C., and aqueous solutions of 0.15% ferrous sulfate heptahydrate, 10% t-butyl hydroperoxide, and 7% isoascorbic acid were added to the reactor. The batch was further cooled to 45° C., and neutralized with aqueous ammonia to a pH of 9–9.5. The final polymer dispersion had a solids content of 46.5 wt %.

| MONOMER EMULSION CHARGES FOR EXAMPLE 1 | |
| --- | --- |
| Deionized water | 783 g |
| Surfactant | 19 g |
| Butyl acrylate | 707 g |
| Styrene | 846 g |
| Hydroxyethyl acrylate | 91 g |
| Acetoacetoxyethyl methacrylate | 297 g |
| Allyl methacrylate | 10 g |

EXAMPLE 2

A stirred reactor containing 1047 g deionized water, 2.3 g sulfated nonyl phenolethoxylate surfactant, and 6.9 g sodium carbonate, was heated to 82° C. under a nitrogen atmosphere. A charge of 155 g monomer emulsion, shown below, was added to the reactor with a 25 g deionized water rinse, followed by 5 g ammonium persulfate dissolved in 30 g deionized water. After 18 minutes, the remainder of the monomer emulsion and a solution of 3 g ammonium persulfate in 100 g deionized water were pumped into the reactor over a 2.5 hour period, while the reactor temperature was maintained at 80° C. Thirty minutes after completion of the feeds, the batch was cooled to 65° C., and aqueous solutions of 0.15% ferrous sulfate heptahydrate, 10% t-butyl hydroperoxide and 7% isoascorbic acid, were added to the reactor. The batch was further cooled to 45° C., and neutralized with ammonia to a pH of 9–9.5. The final polymer dispersion had a solids content of 46.5 wt %.

| MONOMER EMULSION CHARGES FOR EXAMPLE 2 | |
| --- | --- |
| Deionized water | 783 g |
| Surfactant | 19 g |
| Ethylhexyl acrylate | 614 g |
| Styrene | 939 g |
| Hydroxyethyl methacrylate | 91 g |
| Acetoacetoxyethyl methacrylate | 297 g |
| Methacrylic acid | 40 g |
| Allyl methacrylate | 10 g |

EXAMPLES 3–25

The following Examples 3–25 were prepared using methods similar to those of Examples 1 and 2, except that alternative monomer compositions were used, as indicated in the following table. Monomer composition is shown as wt % of total monomer content used to prepare the polymer examples. Abbreviations used in Examples 3–25 are listed below.

EA Ethyl Acrylate
EHA Ethylhexyl Acrylate
BA Butyl Acrylate
STY Styrene
MMA Methyl Methacrylate
AAEM Acetoacetoxyethyl Methacrylate
HEMA Hydroxyethyl Methacrylate
ALMA Allyl Methacrylate
PGMM Propyleneglycol Monomethacrylate
IA Itaconic Acid
MAA Methacrylic Acid
MAM Methacrylamide AEP Aminoethyl Piperazine
HMDA Hexamethylene Diamine
Dytek A* 2-Methylpentamethylene Diamine
*available from E. L DuPont de Nemours, Wilmington, Del.

Examples 3 through 25 were tested for one-pack storage-stability by mixing 50 g of the example composition with 1 molar equivalent of the amine listed in the table. Mixing ratios were based on acetoacetoxyethyl methacrylate molar equivalent weight of the example composition and the reactive amine nitrogen equivalent weight of the selected amine. Once mixed, the samples were place in a sealed container that was then placed in an oven for 10 days at 60° C. Samples that did not gel during these stability tests were considered to be one-pack storage-stable ("Pass").

Hansch values are employed as a relative measure of polymer composition hydrophobicity. Monomer Hansch values were obtained using the method described by A. J. Leo in *Chem. Rev.*, 93(4):1281–1306 (1993). Polymer Hansch values shown in the following tables were calculated by summing the products of the monomer weight percents with their respective monomer Hansch values.

Discussion:

Examples 3 and 4 demonstrate that hydrophilic polymers (those which have low Hansch values) are not storage-stable when mixed with polyfunctional polyamines. Example 5 demonstrates marginal stability as evidenced by remaining gel free when mixed with one polyfunctional polyamine (HMDA), but not another (AEP). Examples 7–18, 20–23, and 25 demonstrate that hydrophobic polymers (those which have a Hansch value above 1.5) are storage-stable, provided that the polymers contain non-acidic functional groups having hydrogen-bondable moieties. (HEMA, PGMM, and MAM are examples of monomers which, when incorporated into a polymer, provide such moieties.) Examples 6, 19 and 24 demonstrate that, even if the polymer is hydrophobic (as evidenced by a Hansch value of greater than 1.5), without the presence of non-acidic functional groups having hydrogen-bondable moieties in the polymer, storage stability is not achieved.

The following Examples 26–28 illustrate the utility of the compositions of the present invention as binders for coating applications. Test methods used to demonstrate the utility of the compositions of the present invention as binders for coating applications are described below.

| | Example | | | | | | | | | | | | | |
|---|---|---|---|---|---|---|---|---|---|---|---|---|---|---|
| | 3 | 4 | 5 | 6 | 7 | 8 | 9 | 10 | 11 | 12 | 13 | 14 | 15 | 16 |
| EA | 45 | 19.6 | 0 | 0 | 0 | 0 | 0 | 0 | 0 | 0 | 0 | 0 | 0 | 0 |
| EHA | 0 | 0 | 0 | 0 | 0 | 0 | 0 | 0 | 0 | 0 | 0 | 0 | 0 | 0 |
| BA | 0 | 20 | 35.7 | 36.7 | 35.7 | 32.7 | 35.7 | 34.4 | 51.4 | 34.7 | 40.7 | 35.7 | 35.5 | 33.6 |
| STY | 0 | 0 | 0 | 0 | 14.2 | 32.1 | 28.5 | 37.8 | 27 | 39.2 | 37.3 | 42.7 | 44.3 | 45.3 |
| MMA | 33.4 | 39 | 42.7 | 46.3 | 28.5 | 0 | 14.2 | 0 | 0 | 0 | 0 | 0 | 0 | 0 |
| AAEM | 15 | 15 | 15 | 15 | 15 | 15 | 15 | 15 | 15 | 15 | 15 | 15 | 11.3 | 15 |
| HEMA | 4.6 | 4.6 | 4.6 | 0 | 4.6 | 18.2 | 4.6 | 0 | 5 | 9.1 | 5 | 4.6 | 6.9 | 4.1 |
| ALMA | 0.5 | 0.5 | 0.5 | 0.5 | 0.5 | 0.5 | 0.5 | 0.5 | 0.5 | 0.5 | 0.5 | 0.5 | 0.5 | 0.5 |
| PGMM | 0 | 0 | 0 | 0 | 0 | 0 | 0 | 10.8 | 0 | 0 | 0 | 0 | 0 | 0 |
| IA | 1.5 | 1.5 | 1.5 | 1.5 | 1.5 | 1.5 | 1.5 | 1.5 | 1.5 | 1.5 | 1.5 | 1.5 | 1.5 | 1.5 |
| MAA | 0 | 0 | 0 | 0 | 0 | 0 | 0 | 0 | 0 | 0 | 0 | 0 | 0 | 0 |
| MAM | 0 | 0 | 0 | 0 | 0 | 0 | 0 | 0 | 0 | 0 | 0 | 0 | 0 | 0 |
| Hansch value | 1.05 | 1.25 | 1.41 | 1.46 | 1.66 | 1.84 | 1.92 | 2.00 | 2.09 | 2.06 | 2.14 | 2.18 | 2.20 | 2.20 |
| Stability Test Results | | | | | | | | | | | | | | |
| AEP | Fail | Fail | Fail | Fail | Pass | Pass | Pass | Pass | Pass | Pass | Pass | Pass | Pass | Pass |
| HMDA | Fail | Fail | Pass | Fail | Pass | Pass | Pass | Pass | Pass | Pass | Pass | Pass | Pass | Pass |
| Dytek A | Fail | Fail | N/T* | N/T | Pass | N/T | Pass | Pass | Pass | N/T | N/T | N/T | N/T | Pass |

| | Example | | | | | | | | |
|---|---|---|---|---|---|---|---|---|---|
| | 17 | 18 | 19 | 20 | 21 | 22 | 23 | 24 | 25 |
| EA | 0 | 0 | 0 | 0 | 0 | 0 | 0 | 0 | 0 |
| EHA | 0 | 0 | 0 | 0 | 31 | 30.8 | 34.5 | 31.8 | 44.5 |
| BA | 35.5 | 35 | 36.7 | 36.5 | 0 | 0 | 0 | 0 | 0 |
| STY | 45.9 | 45.5 | 46.3 | 49.4 | 47.4 | 47.1 | 45.5 | 51.2 | 33.9 |
| MMA | 0 | 0 | 0 | | 0 | 0 | 0 | 0 | 0 |
| AAEM | 7.5 | 15 | 15 | 7.5 | 15 | 14.9 | 15 | 15 | 15 |
| HEMA | 9.1 | 0 | 0 | 4.6 | 4.6 | 4.6 | 0 | 0 | 4.6 |
| ALMA | 0.5 | 0 | 0.5 | 0.5 | 0.5 | 0.5 | 0 | 0.5 | 0.5 |
| PCMM | 0 | 0 | 0 | 0 | 0 | 0 | 0 | 0 | 0 |
| IA | 1.5 | 0 | 1.5 | 1.5 | 1.5 | 0 | 0 | 1.5 | 1.5 |
| MAA | 0 | 2 | 0 | 0 | 0 | 2 | 2 | 0 | 0 |
| MAM | 0 | 3 | 0 | 0 | 0 | 0 | 3 | 0 | 0 |
| Hansch value | 2.22 | 2.24 | 2.29 | 2.33 | 2.81 | 2.82 | 2.91 | 2.95 | 3.01 |
| Stability Test Results | | | | | | | | | |
| AEP | Pass | Pass | Fail | Pass | Pass | Pass | Pass | Fail | Pass |
| HMDA | Pass | N/T | Fail | Pass | Pass | N/T | N/T | N/T | N/T |
| Dytek A | N/T | Pass | N/T | N/T | Pass | Pass | Pass | Fail | Pass |

*N/T = Not Tested

Hot Block Test—Hardboard test specimens (7.6×10.2 ×1.3 cm) were coated with ~1.5 mil dry primer paint and cured to a peak board surface temperature of 177° C. and allowed to cool to a surface temperature of 60° C. The test specimens were then placed perpendicularly face-to-face and pressed for 6 minutes at 15.5 kg/cm$^2$ using a Carver Press. Insulating backer boards were used on either side of the test specimen, The platens were not heated. The coating was considered to be acceptable if only slight or no force was required to separate the specimens and no film damage occurred.

Adhesion Test—Hardboard test specimens (7.6×10.2 ×1.3 cm) were coated with ~1.5 mil dry primer paint and cured to a peak board surface temperature of 177° C. After allowing them to condition at room temperature for at least a day, tape (#250) is applied to the surface and pulled off at quickly at a 90° angle. Adhesion is recorded as % loss. Alternatively, the test can be conducted on a X-scribed surface or one which has been soaked with deionized water for 1 hour prior to testing.

MEK Double Rubs—Hardboard test specimens (7.6×10.2 ×1.3 cm) were coated with ~1.5 mil dry primer paint and allowed to cure under the specified conditions. Grade 20B cheese cloth was wrapped around the rubber glove covered index finger of the tester. The cheese cloth clad finger was then immersed into methyl ethyl ketone (MEK), removed, and then placed on the surface of the cured film at a 45 degree angle. The film surface is then rubbed with moderate pressure using back and forth strokes. The number of strokes required to break through the film to expose the substrate is considered the end point.

EXAMPLE 26

A pigment base was prepared using a COWLES dissolver from the components listed in the table below.

| INGREDIENT | AMOUNT (g) |
|---|---|
| Dispersant | 22.29 |
| Triethylamine | 3.32 |
| Water | 188.87 |
| TiO$_2$ | 184.17 |
| Silica | 34.14 |
| Talc | 35.74 |
| Clay | 290.8 |
| Bentonite | 0.75 |
| Defoamer | 3.37 |

To 59.3 g of this pigment base was add 50 g (46.2 wt % total solids) of the emulsion polymer prepared in Example 13, 2.4 g ethylene glycol monobutyl ether, and 0.4 g aminoethylethanolamine. The resulting paint was applied to a reconstituted board substrate using a draw-down bar (to give 1.5 mil dry film thickness), and cured for 30 seconds in a 177° C. oven followed by infrared heating until the board surface temperature reached 177° C. After cooling to room temperature, the coating was tested and found to give >200 methyl ethyl ketone ("MEK") double rubs and 0% adhesion loss.

EXAMPLE 27

To 60.25 g the pigment base described in Example 26, was added 50 g (46.8 wt % total solids) of the emulsion polymer prepared in Example 20,2.4 g ethylene glycol monobutyl ether, and 0.53 g aminoethylpiperazine. The paint thus prepared was applied as in Example 26 to give a film having >200 MEK double rubs and good hot block resistance (as evidenced by no panel sticking when the coated surfaces of the substrate were placed face-to-face and pressed at 15.5 kg/cm$^2$ and 66° C. for 6 minutes).

EXAMPLE 28

A white pigment base was prepared using a COWLES dissolver from the components listed in the table below.

| INGREDIENT | AMOUNT (g) |
|---|---|
| TiO$_2$ | 1082.97 |
| Wetting agent | 14.09 |
| Dispersant | 21.08 |
| Defoamer | 0.27 |
| Water | 1054.19 |

To 38.5 g the white pigment base was added 83.5 g (46.5 wt % total solids) of the emulsion polymer prepared in Example 22,3.3 g 10% propylene glycol, monobutyl ether, and 1.5 g 2-methyl-1,5-pentanediamine. The paint was applied to a reconstituted wood substrate, and allowed to dry for 14 days at room temperature The cured coating demonstrated good coating performance, as evidenced by 0% adhesion loss after a tape-pull test.

EXAMPLE 29

This example demonstrates the utility of a polymeric polyfunctional polyamine as a crosslinking agent for the polymers of the present invention.

A 45% (pigment volume concentration) gray paint was prepared by mixing together (with stirring) 25.0 g of the 46.4 wt % solids polymer emulsion prepared in Example 14, 2.59 g of a 29 wt % solution of poly(hydroxyethylaminoethyl) methacrylate, 35.7 g of the pigment base prepared in Example 26, and 1.4 g ethylene glycol monobutyl ether. The paint thus prepared contained 0.5 molar equivalents of reactive amine nitrogen per 1.0 molar equivalent of polymer containing acetoacetoxy functional group. The paint was applied to a hard board substrate using a wire draw-down rod to give 1.5 mil dry film after curing for 30 seconds at 177° C. followed by infrared oven curing until the board surface temperature was 177° C. After cooling to room temperature, the cured film gave greater than 200 MEK double-rubs and a Cobb value of 2 g/100 cm$^2$. The Cobb test (TAPPI Standard Test Method T 441 os-77) is a measure of water absorbed through a paint film into a wood based substrate.) The cured film was also tested for hot block resistance by pressing two paint coated specimens face-to-face at 15.5 kg/cm$^2$ and 66° C. for six minutes. The paint of this example showed no sticking or film damage after being tested for hot block resistance as per described.

EXAMPLE 30

This example demonstrates the utility of the present invention as an ambient temperature crosslinking binder in a white 20% (pigment volume concentration) coating.

An emulsion polymer having a composition of 46.8 wt % 2-ethylhexylacrylate, 38.2 wt % methylmethacrylate, 10 wt % acetoacetoxyethylmethacrylate, 3 wt % hydroxyethylmethacrylate, 1.5 wt % itaconic acid, and 0.5 wt % allylmethacrylate, was prepared in accordance with the method of Example 1. To 67.2 g of this emulsion (46% solids) was added (with stirring using a COWLES dissolver) 1.6 g dispersant, 12.4 g titanium dioxide (TiO$_2$), 1.4 g silica, 1.5 g talc, 7.4 g clay, 0.04 g bentonite (thickener), 10.2 g water, and 0.14 g defoamer. Upon completion of the COWLES mixing, 1.0 g 1,5-diamino-2-methylpentane and 1.6 g ethylene glycol monobutyl ether were added with gentle stirring. The thus prepared paint was applied to an aluminum panel using a wire draw-down rod to give, after drying, a 1.5 mil dry film. After 1 week of room temperature curing, the panel gave >200 MEK double rubs.

EXAMPLE 31

This example demonstrates one-pack storage-stability of an emulsion polymer containing no acid.

An emulsion polymer having a 44.6 wt % solids content and a composition of wt % butylacrylate, 45 wt % styrene, 15 wt % acetoacetoxyethylmethacrylate, and 5 wt % hydroxyethylmethacrylate, was prepared in accordance with the method of Example 1. To 50.0 g of the emulsion polymer was added with stirring 0.89 g 1,2-diaminocyclohexane. The mixture thus produced was found to be one-pack storage-stable as evidenced by remaining fluid and gel-free after being heat-aged in an oven at 60° C. for 10 days.

EXAMPLE 32

This example illustrates the effect polymer acid functionality has on increasing water penetration through a cured paint film composed of said acid functionality containing polymer.

An emulsion polymer having a 46.4 wt % solids content and a composition of 31 wt % 2-ethylhexylacrylate, 46.9 wt % styrene, 15 wt % acetoacetoxyethyl-methacrylate, 4.6 wt % hydroxyethylmethacrylate, 2.0 wt % methacrylic acid, and 0.5 wt % allylmethacrylate, was prepared in accordance with the method of Example 1. A second emulsion polymer having no acid functionality, and having a composition of 31 wt % 2-ethylhexylacrylate, 48.9 wt % styrene, 15 wt % acetoacetoxyethyl-methacrylate, 4.6 wt % hydroxyethylmethacrylate, and 0.5 wt % allylmethacrylate, was prepared simultaneously. Paints (52% pigment volume concentration) were made from each emulsion by mixing 50.0 g of each emulsion polymer with 1.15 g 5 1,2-diaminocyclohexane and 114 g of a 69.2 wt % solids paint-base grind consisting of titanium dioxide, clay, iron oxide, defoamer, propylene glycol monobutyl ether, and water. Each paint was applied using a wire draw-down bar to 7.6×10.2 ×1.3 cm hardboard test specimens and cured for 30 seconds in an oven set at 177° C., followed by surface heating in an infra-red oven until a surface temperature of 177° C. was reached. Water permeability was measured using the Cobb method which involves securing a 2.5 cm tall by 6 cm diameter tube to the painted surface of the test specimen, filling the tube with water, and measuring the weight gain of the test specimen after 24 hours as a function of grams water absorbed per 100 $cm^2$ ("g/100 $cm^2$"). The paint prepared from the emulsion polymer containing acid gave a Cobb value of 9 g/100 $cm^2$ while the paint prepared from the above described emulsion polymer having no acid gave a Cobb value of 3 g/100 $cm^2$.

EXAMPLE 33

The following Examples 33–35 illustrate the effect on water permeability when a polyoxyalkylene polyamine amine is used to crosslink an acetoacetate functional polymer.

Paints (20% pigment volume concentration) were prepared according to the table below and crosslinked with either a polyoxyalkylene polyamine (Mn=600) or an aliphatic diamine (1,2 diaminocyclohexane):

| Example | 33 | 34 | 35 |
|---|---|---|---|
| Emulsion polymer of Example 22 (46 wt % solids) | 70.5 g | 60.5 g | 84.5 g |
| White pigment base of Example 28 | 38.5 g | 38.5 g | 38.5 g |
| Propylene glycol monobutyl ether | — | — | 3.3 g |
| Polyoxyalkylene polyamine (Mn = 600) | 6.7 g | 11.8 g | — |
| 1,2-diaminocyclohexane | — | — | 1.5 g |
| Amine nitrogen equivalents per acetoacetoxy group equivalents | 1 | 2 | 1 |

The paints of Examples 33–35 were applied using a wire draw-down bar to 7.6×7.6×10.2×1.3 cm hardboard test specimens to give equivalent dry film thicknesses. The coated test specimens were cured at room temperature for 1 week, then tested for water permeability using the Cobb method. Example 33 gave a Cobb value of 14 g/100 $cm^2$, Example 34 a Cobb value of 17 g/100 $cm^2$, and Example 35 gave a Cobb value of 12 g/100 $cm^2$, thus illustrating that increases in the concentration of the polyoxyalkylene polyamine crosslinker result in increases in water permeability.

What is claimed is:

1. An aqueous self-crosslinkable polymeric dispersion having a low moisture permeability comprising:
    (a) a polymeric component comprising an aqueous dispersion of polymer particles neutralized to a pH of not less than 6, the polymer particles having a Hansch value of 1.5 or greater, an acid number of 0–25, at least 5 percent by weight ("wt %") of a carbonyl functional group capable of reacting with a nitrogen moiety, and at least 1 wt % of a non-acidic functional group having hydrogen-bondable moieties;
    (b) a crosslinking agent comprising a nitrogen-containing compound having at least two nitrogen functional groups capable of reacting with a carbonyl functional moiety, wherein the mole equivalents ratio of such crosslinking agent to reactive carbonyl moieties is at least 0.25:1, and wherein said dispersion having said low moisture permeability placed in a sealed container is shelf stable for 10 days in an oven at 60° C.

2. The polymeric dispersion of claim 1, wherein the nitrogen-containing compound has at least two amine functional groups capable of reacting with a carbonyl functional moiety.

3. The polymeric dispersion of claim 1, wherein the acid number of the polymer particles is 1–20.

4. The polymeric dispersion of claim 3, wherein the acid number of the polymer particles is 5–15.

5. The polymeric dispersion of claim 1, wherein the polymer particles have at least 8 wt % of a carbonyl functional group capable of reacting with an amine nitrogen moiety.

6. The polymeric dispersion of claim 5, wherein the polymer particles have at least 12 wt % of a carbonyl functional group capable of reacting with an amine nitrogen moiety.

7. The polymeric dispersion of claim 1, wherein the polymer particles have at least 3 wt % of a non-acidic functional group having hydrogen-bondable moieties.

8. The polymeric dispersion of claim 7, wherein the polymer particles have at least 3 wt % of a non-acidic functional group having hydrogen-bondable moieties.

9. The polymeric dispersion of claim 1, wherein the mole ratio of such crosslinking agent to reactive carbonyl moieties is at least 0.5:1.

10. The polymeric dispersion of claim 9, wherein the mole ratio of such crosslinking agent to reactive carbonyl moieties is at least 1:1.

11. An aqueous, storage-stable crosslinkable coating composition comprising the polymeric dispersion of claim 1.

12. A method for providing a crosslinked protective coating on a substrate, comprising the steps of: applying a coating of the composition of claim 10 to the substrate; and allowing the composition to cure at room temperature or greater.

13. The method of claim 12, wherein the substrate is selected from the group consisting of: wood and reconstituted wood products, concrete, asphalt, fiber cement, stone, marble, clay, plastics, paper, cardboard, and metal.

14. A binder for storage-stable, one-component coating compositions capable of undergoing crosslinking at room temperature or greater, said binder comprising the polymeric dispersion of claim 1.

15. An adhesive comprising the polymeric dispersion of claim 1.

* * * * *

UNITED STATES PATENT AND TRADEMARK OFFICE
CERTIFICATE OF CORRECTION

PATENT NO.     : 6,512,042 B1
DATED          : January 28, 2003
INVENTOR(S)    : Fischer et al.

It is certified that error appears in the above-identified patent and that said Letters Patent is hereby corrected as shown below:

<u>Title page,</u>
Item [*], delete "0" and insert -- 759 --.

Signed and Sealed this

Twenty-second Day of April, 2003

JAMES E. ROGAN
*Director of the United States Patent and Trademark Office*